US011979391B2

(12) United States Patent
Dhammawat et al.

(10) Patent No.: US 11,979,391 B2
(45) Date of Patent: May 7, 2024

(54) ACCESS POINT MANAGER FOR ROAMING USER PRODUCTS

(71) Applicant: Cisco Technology, Inc., San Jose, CA (US)

(72) Inventors: Abhishek Dhammawat, San Jose, CA (US); Mansi Jain, San Jose, CA (US); Sudhir Kumar Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/814,345

(22) Filed: Jul. 22, 2022

(65) Prior Publication Data

US 2022/0360578 A1 Nov. 10, 2022

Related U.S. Application Data

(63) Continuation of application No. 16/518,144, filed on Jul. 22, 2019, now Pat. No. 11,411,942.

(51) Int. Cl.
*H04L 9/40* (2022.01)
*H04W 8/24* (2009.01)
(Continued)

(52) U.S. Cl.
CPC .......... *H04L 63/0807* (2013.01); *H04W 8/24* (2013.01); *H04W 12/041* (2021.01); *H04W 12/06* (2013.01)

(58) Field of Classification Search
CPC .. H04L 63/0807; H04W 12/041; H04W 8/24; H04W 12/06; H04W 12/062
See application file for complete search history.

(56) References Cited

U.S. PATENT DOCUMENTS

| 6,370,380 B1 | 4/2002 | Norefors et al. |
| 7,275,157 B2 * | 9/2007 | Cam Winget ..... H04W 36/0088 713/168 |

(Continued)

FOREIGN PATENT DOCUMENTS

| CN | 101568107 A | * | 10/2009 | ............ H04W 12/04 |
| TW | 201427361 A | * | 7/2014 | ........... H04L 63/061 |

OTHER PUBLICATIONS

A Bill Dispensing Device, a Fast Authentication Device, an Access Point and a Method Thereof, Clarivate Analytics, CN 101568107 (Year: 2009).*

(Continued)

*Primary Examiner* — Richard A McCoy
(74) *Attorney, Agent, or Firm* — Polsinelli P.C.

(57) ABSTRACT

Systems, methods, and computer-readable media are provided for an efficient roaming management method using a single association identifier token for associating with different access points. In one aspect of the present disclosure, a network controller includes memory having computer-readable instructions stored therein and one or more processors. The one or more processors are configured to execute the computer-readable instructions to receive a request from an endpoint to connect to a first access point; generate association identification token (e.g., PMK and PMKID) for the endpoint to connect to the first access point; and distribute the association identification token to a second access point prior to the endpoint attempting to connect to the second access point, the association identification token being used by the second access point to validate a subsequent request by the endpoint to connect to the second access point.

20 Claims, 9 Drawing Sheets

(51) Int. Cl.
H04W 12/041 (2021.01)
H04W 12/06 (2021.01)

(56) References Cited

U.S. PATENT DOCUMENTS

| | | | | |
|---|---|---|---|---|
| 8,281,133 | B1* | 10/2012 | Tkal | H04W 12/50 |
| | | | | 713/171 |
| 9,779,401 | B2 | 10/2017 | Benoit et al. | |
| 10,904,805 | B1 | 1/2021 | Sheriff et al. | |
| 10,932,183 | B1 | 2/2021 | Strong et al. | |
| 2006/0083200 | A1 | 4/2006 | Emeott et al. | |
| 2006/0105714 | A1* | 5/2006 | Hall | H04W 12/086 |
| | | | | 455/41.3 |
| 2012/0005731 | A1* | 1/2012 | Lei | H04L 63/083 |
| | | | | 726/6 |
| 2013/0196708 | A1 | 8/2013 | Narasimhan et al. | |
| 2014/0050320 | A1* | 2/2014 | Choyi | H04W 12/06 |
| | | | | 380/270 |
| 2014/0073289 | A1 | 3/2014 | Velasco et al. | |
| 2014/0273958 | A1 | 9/2014 | Messana et al. | |
| 2015/0127949 | A1 | 5/2015 | Patil et al. | |
| 2015/0237519 | A1* | 8/2015 | Ghai | H04L 63/0892 |
| | | | | 370/252 |
| 2016/0112869 | A1 | 4/2016 | Lee et al. | |
| 2016/0127903 | A1 | 5/2016 | Lee et al. | |
| 2017/0177867 | A1* | 6/2017 | Crofton | G06F 21/565 |
| 2017/0230826 | A1* | 8/2017 | Mestanov | H04L 63/0876 |
| 2018/0183723 | A1 | 6/2018 | Cariou et al. | |
| 2018/0376470 | A1* | 12/2018 | Crawley | H04L 47/122 |
| 2020/0322344 | A1* | 10/2020 | Chambers | H04L 63/102 |
| 2021/0014732 | A1 | 1/2021 | Chen et al. | |
| 2021/0076213 | A1 | 3/2021 | Pandey et al. | |

OTHER PUBLICATIONS

WPA3 and Enhanced Open: Next Generation Wi-Fi Security, aruba, a HP company (Year: 2018).*
IEEE Standard for Information technology—Telecommunications and information exchange between systems—Local and metropolitan area networks—Specific requirements Part 11: Wireless LAN Medium Access Control (MAC and Physical Layer (PHY) Specifications Amendment 2: Fast Basic Service Set (BSS) (Year: 2008).
International Standard ISO/IEC9798-2 Mechanisms using syrmnetric encipherment algorithms, 1999, Second Edition.
"Enhanced Open-Same Same but Encrypted, "wlan1nd.wordpress.com, Feb. 13, 2019, pp. 1-28.

* cited by examiner

ACCESS POINT MANAGER FOR ROAMING USER PRODUCTS

CROSS-REFERENCE TO RELATED APPLICATIONS

The instant application is a Continuation of, and claims priority to, U.S. patent application Ser. No. 16/518,144 entitled SYSTEMS AND METHODS FOR ROAMING MANAGEMENT BETWEEN ACCESS POINTS filed Jul. 22, 2019.

TECHNICAL FIELD

The present technology pertains in general to management of roaming of endpoints between access points in a network and more specifically to an efficient roaming management method using a single association identification token for associating with/connecting to different access points.

BACKGROUND

Simultaneous Authentication of Equals (SAE) is a planned WiFi Protected Access Protocol 3 (WPA-3) aimed at improving security of wireless networks such as next generation IEEE 802.11x (WiFi 6) networks.

In WPA-3, no roaming solution is defined for devices that may switch from one WiFi 6 access point to another. Reliance on traditional Sticky Key Caching (SKC) for roaming purposes has shortcomings. For example, according to SKC, every time a device attempts to connect to a new access point, the device needs to perform a separate authentication process that involves creation of a Pairwise Master Key (PMK) and a corresponding PMK identifier (PMKID). A record of each PMK/PMKID is then to be maintained at a controller (e.g., a Wireless LAN Controller (WLC), which has storage capacity limitations. The same limitations exists for Opportunistic Wireless Encryption, which is another protocol used for association/connecting devices to WiFi 6 networks and access points.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
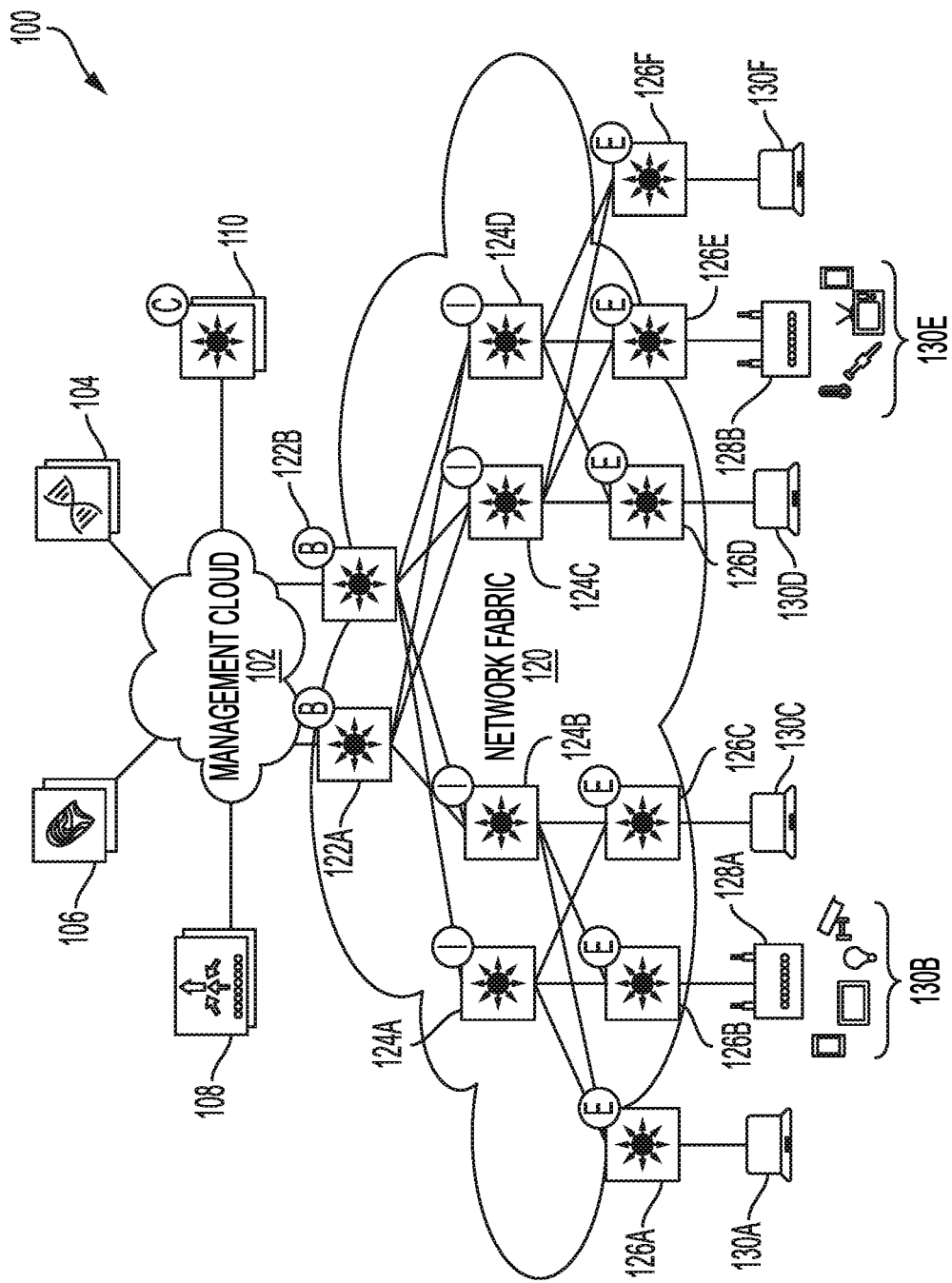
FIG. 1 illustrates an example of a physical topology of a network in accordance with one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are systems, methods, and computer-readable media for ensuring that a single Pairwise Master Key (PMK) and Pairwise Master Key Identifier (PMKID) assigned to an endpoint (wired or wireless) attempting to connect to a first access point in a network, can be used for subsequent connection/association of the endpoint to any other access point in the network. In other words, the present disclosure enables an endpoint to perform a Simultaneous Authentication of Equals (SAE) and/or Opportunistic Wireless Encryption (OWE) association with a network controller once at the time of connecting to the first access point. The resulting PMK and PMKID can then be used for subsequent connection of the endpoint to other access points without having to re-perform SAE and/or OWE.

In one aspect of the present disclosure, a network controller includes memory having computer-readable instructions stored therein and one or more processors. The one or more processors are configured to execute the computer-readable instructions to receive a request from an endpoint to connect to a first access point; generate association identifier token for the endpoint to connect to the first access point; and distribute the association identifier token to a second access point prior to the endpoint attempting to connect to the second access point, the association identification token being used by the second access point to validate a subsequent request by the endpoint to connect to the second access point.

In one aspect of the present disclosure, a method includes receiving, at a network controller, a request from an endpoint to connect to a first access point; generating, at the network controller, association identification token for the endpoint to connect to the first access point; and distributing, at the network controller, the association identifier token to a second access point prior to the endpoint attempting to connect to the second access point, the association identification token being used by the second access point to validate a subsequent request by the endpoint to connect to the second access point.

In one aspect of the present disclosure, one or more non-transitory computer-readable media comprising computer-readable instructions, which when executed by one or more processors of a network controller, cause the network controller to receive a request from an endpoint to connect to a first access point; generate association identifier token for the endpoint to connect to the first access point; and distribute the association identifier token to a second access point prior to the endpoint attempting to connect to the second access point, the association identification token being used by the second access point to validate a subsequent request by the endpoint to connect to the second access point.

DETAILED DESCRIPTION

The disclosure begins with a description of an example system in which the concepts of the present disclosure may be implemented in a controlled network of access points in a campus network that provide network connectivity to client devices connected thereto. Such network of access points may be managed by a network controller (e.g., a Dynamic Network Access Controller (DNAC), a Wireless Local Area Network Controller (WLC), etc., examples of which will be described below.

One example of operating a network includes intent-based networking, which is an approach for overcoming the deficiencies of conventional networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10 am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

- An intent-based network can learn the performance needs of applications and services and adapt the network from end-to-end to achieve specified service levels;
- Instead of sending technicians to every office, floor, building, or branch, an intent-based network can discover and identify devices and things as they connect, assign security and micro-segmentation profiles according to established policies, and continuously monitor access point performance to automatically adjust for QoE;
- Users can move freely among network segments, mobile device in hand, and automatically connect with the correct security and access privileges;
- Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and
- Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of a network in accordance with one aspect of the present disclosure. It should be understood that, for network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, network 100 can include any number or type of resources, which can be accessed and utilized by endpoints or network devices. The illustrations and examples provided herein are for clarity and simplicity.

In this example, network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others. In some example embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 125A-F (collectively, 125). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv5, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 125 and provide the Layer 3 underlay for fabric overlay traffic.

The fabric edge nodes 125 can connect endpoints to the network fabric 120 and can encapsulate/decapsulate and forward traffic from these endpoints to and from the network fabric. The fabric edge nodes 125 may operate at the perimeter of the network fabric 120 and can be the first points for attachment of users, devices, and things and the implementation of policy. In some example embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 125 for communication to outside subnets.

In some example embodiments, all subnets hosted in a fabric site can be provisioned across every fabric edge node 125 in that fabric site. For example, if the subnet 10.10.10.0/24 is provisioned in a given fabric site, this subnet may be defined across all of the fabric edge nodes 125 in that fabric site, and endpoints located in that subnet can be placed on any fabric edge node 125 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 125.

Network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 125A, 125C, 125D, and 125F, respectively, and the wireless endpoints 130B and 130E can connect wirelessly to wireless access points 128B and 128B (collectively, 128), respectively, which in turn can connect by wire to fabric edge nodes 125B and 125E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 125. The AP VXLAN tunnel can carry segmentation and policy information to and from the fabric edge nodes 125, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 125. Next, the wireless endpoints 130 can obtain IP addresses for themselves via Dynamic Host Configuration Protocol (DHCP). Once that completes, the fabric edge nodes 125 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
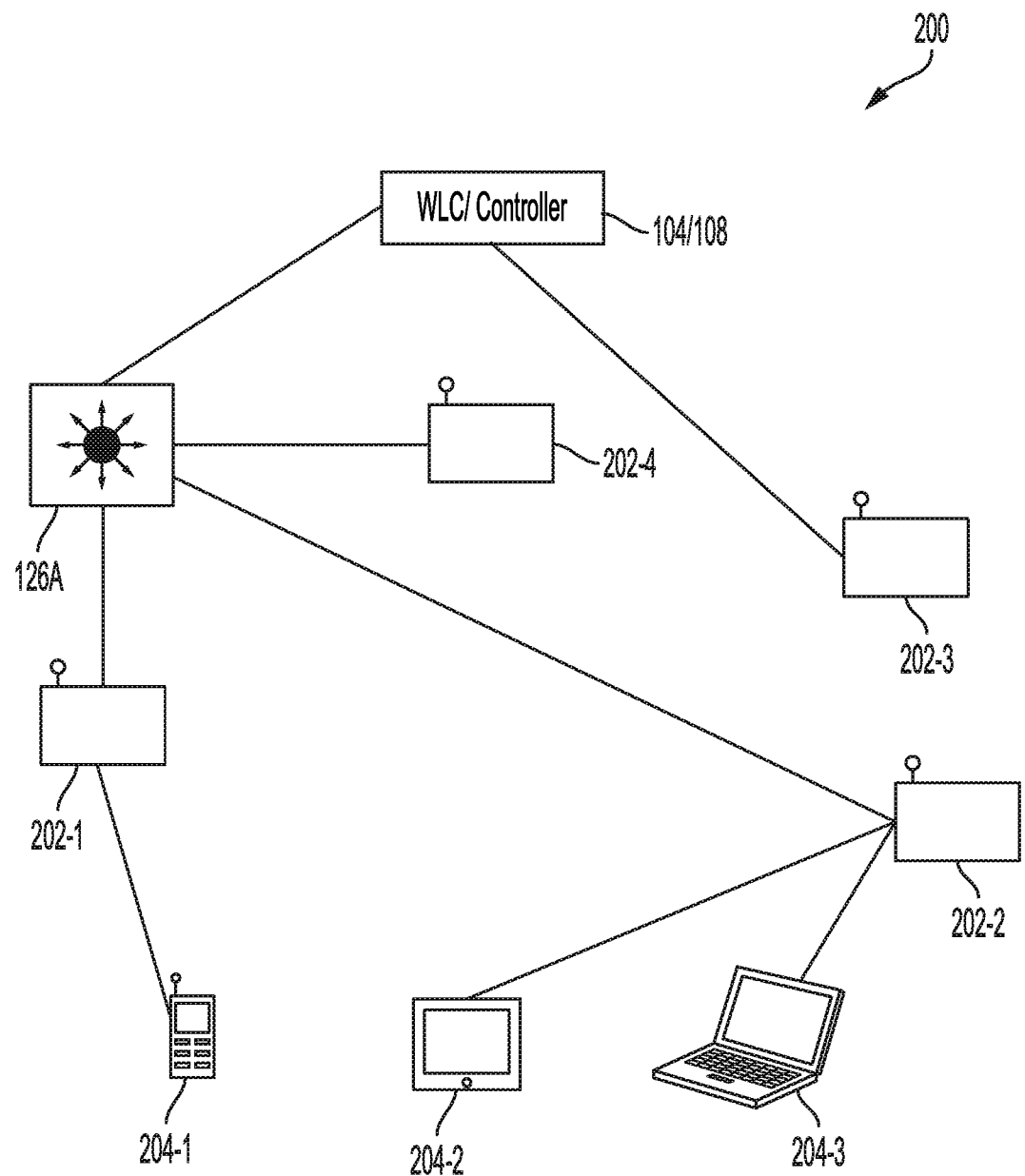
FIG. 2 illustrates a portion of network of FIG. 1, according to an aspect of the present disclosure.

FIG. 2 illustrates a portion of network of FIG. 1, according to an aspect of the present disclosure.

Setting 200 may represent a geographical location (e.g., a building or a warehouse) having one of edge routers 126A-F as a connection point to network 100 and more specifically to network controller appliance 104 and/or WLC 108. Within setting 200, there may be a number of access points 202-1, 202-2, 202-3 and 202-4 (access points 202) that provide connectivity to roaming devices such as endpoints 204-1, 204-2 and 204-3 (endpoints 204). for connecting to network 100 and the broader interne. Access points 202 may be the same or similar to access points 128 of FIG. 1. Endpoints 204 may be the same as wired and/or wireless endpoints 120A-C of FIG. 1. Number of access points 202 and endpoints 204 may be more or less than that shown in FIG. 2.

Each of access points 202 may be an n IEEE 802.11x (WiFi 6) access point implementing WiFi Protected Access Protocol 3 (WPA-3) supporting SAE and/or OWE.

Furthermore, access points 202-1, 202-2, 202-3 and 202-4 may have the same tag-site.

While FIGS. 1 and 2 describe a particular architecture of a DNA as an example network topology/architecture in which the concepts described here may be implemented, the present disclosure is not limited to DNA/fabric networks but can be any type of network having a plurality of access points connected to a controller (e.g., a WLC) and a plurality of devices connected to or attempting to connect to one or more such access points. Accordingly, example structure of FIG. 2 may be generic to any other type of network and is not limited to the example implementation of network of FIG. 1.

As noted above, currently, when, for example, endpoint 204-1 attempts to connect to network 100 and more generally to the Wide Area Network (WAN), endpoint 204-1 does so by associating itself (connecting) to one of access points 202 (e.g., access point 202-1). This connection requires performing an authentication process that involves creation of a Pairwise Master Key (PMK) and a corresponding PMK identifier (PMKID). A record of each PMK/PMKID is then to be maintained at a controller (e.g., a Wireless LAN Controller (WLC) such as WLC 108 and/or network controller appliance (controller) 104 of FIG. 1 (e.g., at a storage facility associated with network 100). This may be referred to as Sticky Key Caching (SKC)

As endpoint 204-1 roams around setting 200 (e.g., the physical location), endpoint 204 may need to switch from access point 202-1 to access point 202-3, for example, to maintain connectivity with network 100 and/or WAN. For each switching, the above process of creating PMK/PMKID and maintaining a record thereof at a controller is repeated for each access point 202 to which endpoint 204 wants to connect.

A given controller such as WLC 108 of network 100 can have up to 64000 clients associated therewith. Additionally, WLC 108 will need to maintain a per AP per client PMK/PMKID cache. As an example, if each setting such as setting 200 has 25 access points such as access points 202, then maintaining 25 PMK/PMKID cache for each endpoint, would result in 1,600,000 at a given WLC 108 (assuming 64000 endpoints per WLC). This is a very large cache that consumes network resources and capacities.

Furthermore, currently there is uncertainty about how many PMK/PMKID records for each access point-endpoint pair should be maintained at WLC 108 to ensure 100% success in roaming from one access point to another.

Given the challenges above, the present disclosure provides techniques for ensuring that a single Pairwise Master Key (PMK) and Pairwise Master Key Identifier (PMKID) assigned to a mobile endpoint attempting to connect to a first access point in a network, can be used for subsequent connection/association of the mobile endpoint to any other access point in the network. In other words, the present disclosure enables a mobile endpoint to perform a Simultaneous Authentication of Equals (SAE) and/or Opportunistic Wireless Encryption (OWE) association with a network controller once at the time of connecting to the first access point. The resulting PMK and PMKID can then be used for subsequent connection of the mobile endpoint to other access points without having to re-perform SAE and/or OWE.

Figure 3:
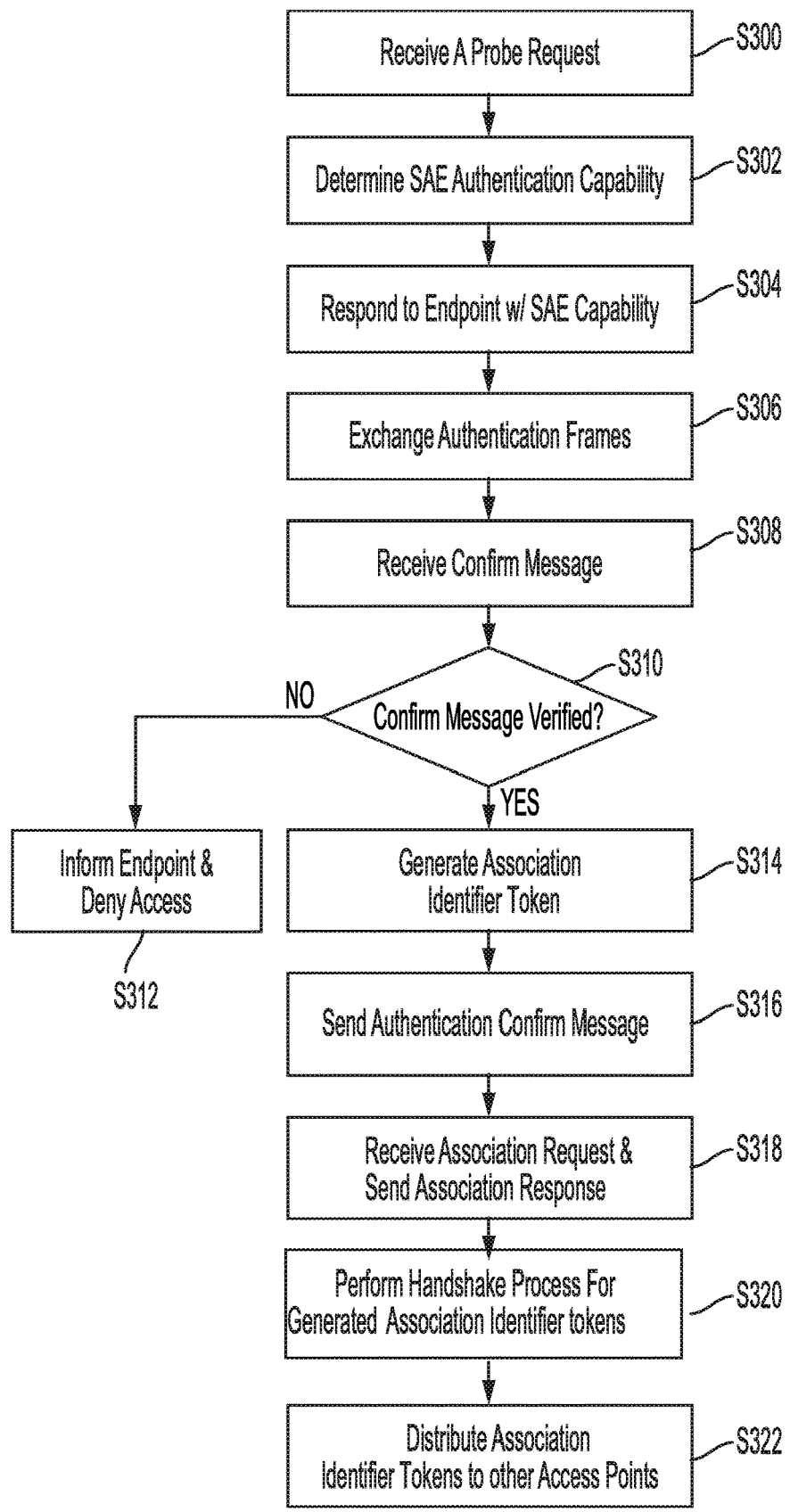
FIG. 3 illustrates a SAE based roaming management method, according to an aspect of the present disclosure.
Figure 4:
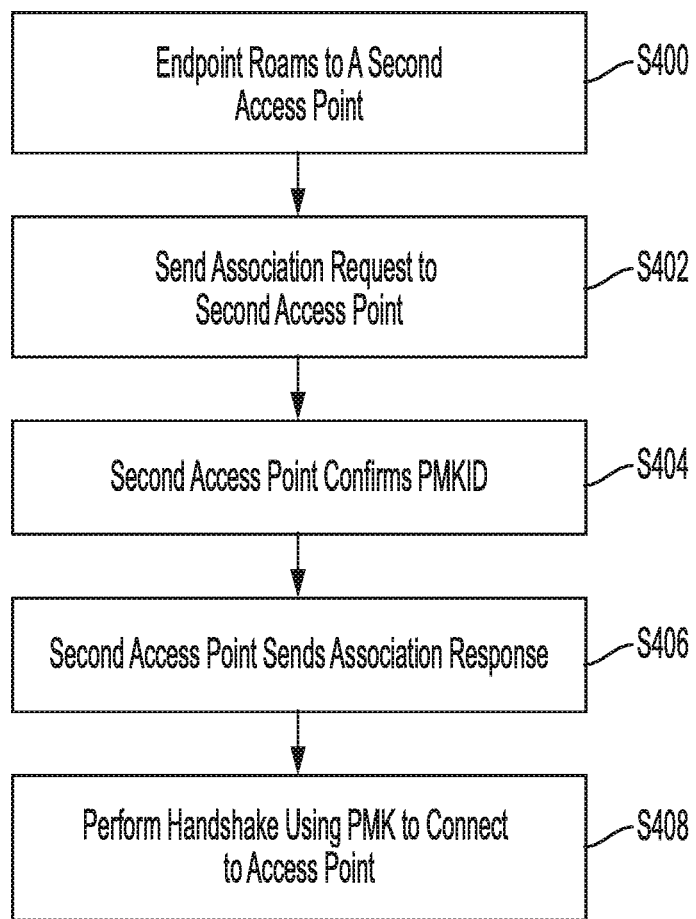
FIG. 4 describes an example roaming of an endpoint, according to an aspect of the present disclosure.

Hereinafter, example embodiments for assigning a single PMK/PMKID to an endpoint for connecting to an access point will be described for both SAE (FIG. 3) and OWE (FIG. 4).

FIG. 3 illustrates a SAE based roaming management method, according to an aspect of the present disclosure. FIG. 3 will be described from perspective of WLC 108 of FIG. 1 and/or FIG. 2. However it will be understood that WLC 108 may have one or more memories storing computer-readable instructions, which when executed by one or more processors, cause the one or more processors to implement functionalities of FIG. 3. Alternatively, steps of method of FIG. 3 may be performed by network controller appliance 104 of FIG. 1. In describing FIG. 3, both WLC 108 and/or network controller appliance 104 may be referred to as a controller. In another example, the functionalities described below with reference to FIG. 3 can be performed by access point 202-1.

At S300, WLC 108 receives a probe request from endpoint 204-1 to associate (connect) to access point 202-1 (first access point).

At S302, WLC 108 determines its SAE authentication capability and at S304 responds to endpoint 204-1 with an Authentication Key Management (AKM) having suitType 8 indicating that WLC 108 is SAE capable.

At S306, WLC 108 and endpoint 204-1 exchange authentication frames, according to any known or to be developed protocol for exchanging authentication frames.

After exchange of authentication frames, endpoint 204-1 computes PMK and PMKID (e.g., PMK1 and PMKID1) and confirm field using, for example, the following syntax/protocol. PMK1 is for associating/connecting to first access point AP 202-1. The generated PMK and PMKID may be referred to as association identification token and may be unique to endpoint 204-1.

confirm=CN(Key confirmation Key (KCK), send-confirm, client-scalar, client-element, CONTROLLER-scalar, CONTROLLER-element)

LCL‖PMK1=KDF-512(keyseed, "SAE KCK and PNK", (Client-scalar+CONTROLLER-scalar) modulo r), where Keyseed=H(<0>32,k);

K=F(K) where F is a function which takes an element and returns a number;

K=scalar.op(rand, (elem-op(scalar-op(CONTROLLER-scalar, PWE), CONTROLLER-element)));

Send-confirm: current value of the send-confirm counter;

L is a function returning greater of two numbers; and

PMKID1=L((client-scalar+CONTROLLER.scalar) mod r, 0, 128).

At S308, WLC 108 receives a confirm message generated by endpoint 204-1 and at S310 verifies the confirm message. Successful verification of the confirm message is indicative of a successful SAE authentication.

If at S310 WLC 108 is not able to verify the received association identification token, then at S312, WLC 108 informs endpoint 204-1 accordingly and denies endpoint 204-1 access to access point 202-1.

However, if at S310, WLC 108 verifies the confirm message, then at S314, WLC 108 generates PMK and PMKID (association identification token), according to any known or to be developed method. Thereafter, at S316, a corresponding authentication confirm message is sent by WLC 108 to endpoint 204-1 acknowledging verification of the confirm message.

Thereafter, at S318, WLC 108 may receive an association request from endpoint 204-1 to connect to access point 202-1 and may send a corresponding association response to endpoint 204-1. At S320, endpoint 204-1 and WLC 108 may also perform a 4-way handshake for derived key generation and installation as known (e.g., by exchange M1, M2, M3 and M4 messages). At S320, WLC 108 and endpoint 204-1 exchange generated association identification tokens at each of WLC 108 and endpoint 204-1. At this point, endpoint 204-1 is connected to (connected to/associated with) access point 202-1.

At S322, WLC 108 sends (distributes) the association identification token (PMK and PMKID (e.g., PMK1 and PMKID1)) to other access points in setting 200 such as access point 202-2, 202-3 and/or 202-4 (with access point 202-2 used as an example of the other access point in FIG.

3). In one example, association identification token is shared with every active access point in setting 200.

With PMK and PMKID (association identification token) now available to all access points in setting 200, FIG. 4 describes an example roaming of an endpoint, according to an aspect of the present disclosure. FIG. 4 will be described from perspective of endpoint 204-1 and access point 202-2 of FIG. 2. However it will be understood that each of endpoint 204-1 and access point 202-2 may have one or more memories storing computer-readable instructions, which when executed by one or more processors, cause the one or more processors to implement functionalities of FIG. 4.

At S400, endpoint 204-1 may roam to a second access point (e.g., access point 202-2).

At S402, endpoint 204-1 sends an association request to access point 202-2 with PMKID1. Given that at S322, access point 202-2 received PMK1 and PMKID1, access point 202-2 can confirm the PMKID1 received from endpoint 204-1 at S404.

Thereafter, at S406 access point 202-2 responds to endpoint 204-1 with an association response including PMKID1. Thereafter, at S408, endpoint 204-1 and access point 202-2 may perform a 4way handshake using PMK1, according to known or to be developed protocols and methods of doing so in order to endpoint 204-1 to connect to access point 202-2.

Process of FIGS. 3 and 4, as described above, provides the advantage that an endpoint need to perform SAE authentication with only a single access point in a network (first access point) and the resulting PMK and PMKID can be used to associate/connect with further access points in the network using the same PMK and PMKID. A further added advantage of this method is that WLC 108 and/or endpoint no longer need to maintain a large database of per AP per endpoint association information (PMKs and PMKIDs). Still another further advantage is improved user experience and the need for endpoint 204-1 to perform multiple SAE authentications is eliminated.

With a SAE roaming management method described above, an OWE based roaming management method will be described next.

Figure 5:
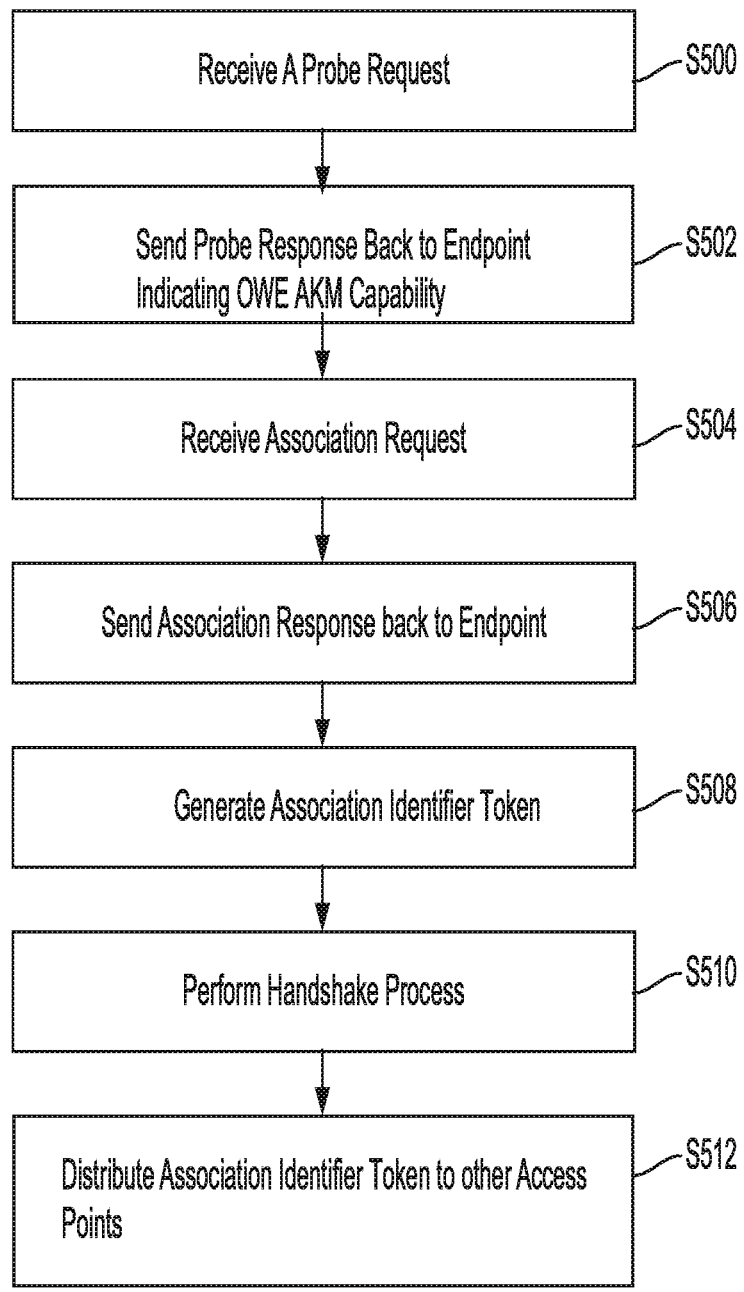
FIG. 5 illustrates an OWE based roaming management method, according to an aspect of the present disclosure.

FIG. 5 illustrates an OWE roaming management method, according to an aspect of the present disclosure. FIG. 5 will be described from perspective of WLC 108 of FIG. 1 and/or FIG. 2. However it will be understood that WLC 108 may have one or more memories storing computer-readable instructions, which when executed by one or more processors, cause the one or more processors to implement functionalities of FIG. 5. Alternatively, steps of method of FIG. 5 may be performed by network controller appliance 104 of FIG. 5. In describing FIG. 5, both WLC 108 and/or network controller appliance 104 may be referred to as a controller. In another example, the functionalities described below with reference to FIG. 4 can be performed by access point 202-1.

At S500, WLC 108 receives a probe request from endpoint 204-1 to connect to access point 202-1 (first access point).

At S502, WLC 108 sends a probe response back to endpoint 204-1 (e.g., RSN IE→AKM→suitType as 18)) to indicate that WLC 108 is OWE-AKM capable.

At S504, WLC 108 receives an association request from endpoint 204-1 (e.g., Diffie-Hellman (DH) element, AKM suitType as 18).

At S506, WLC 108 response with an association response back to endpoint 204-1 (e.g., DH element, AKM suitType as 18).

At S508, WLC 108 generates association identification token (e.g., PMK and PMKID) using OWE authentication parameters (e.g., DH key exchange).

At S510, WLC 108 performs a four way handshake process (using M1, M2, M3 and M4 messages) with endpoint 204-1. Using the association identification token, endpoint 204-1 connects to access point 202-1.

At S512, WLC 108 sends (distribute) the generated association identification token (e.g., PMK and PMKID) to second access point (e.g., access point 202-2). In one example, at S512, WLC 108 may send the association identification token generated at S508 to every other access point in setting 200).

With second access point 202-2 having the generated PMK and PMKID, the process of FIG. 4 may be repeated whereby endpoint 204-1 may roam from first access point 202-1 to second access point 202-2 using the previously generated PMK and PMKID of S508 and without having to re-perform the OWE authentication process.

Similar to processes of FIGS. 3 and 4, processes of FIG. 5 and FIG. 4 also provide the advantage that an endpoint need to perform OWE authentication with only a single access point in a network (first access point) and the resulting PMK and PMKID can be used to associate/connect with further access points in the network using the same PMK and PMKID. A further added advantage of this method is that WLC 108 and/or endpoint no longer need to maintain a large database of per AP per endpoint association information (PMKs and PMKIDs). Still another further advantage is improved user experience and the need for endpoint 204-1 to perform multiple SAE authentications is eliminated.

Described above are methods of SAE based (FIGS. 3 and 4) and OWE based (FIGS. 5 and 4) roaming management. FIGS. 6 and 7 provide an alternative visual representation of call flows between endpoint 204-1, WLC 108, access point 202-1 and access point 202-2 to perform SAE based and OWE based roaming management.

Figure 6A:
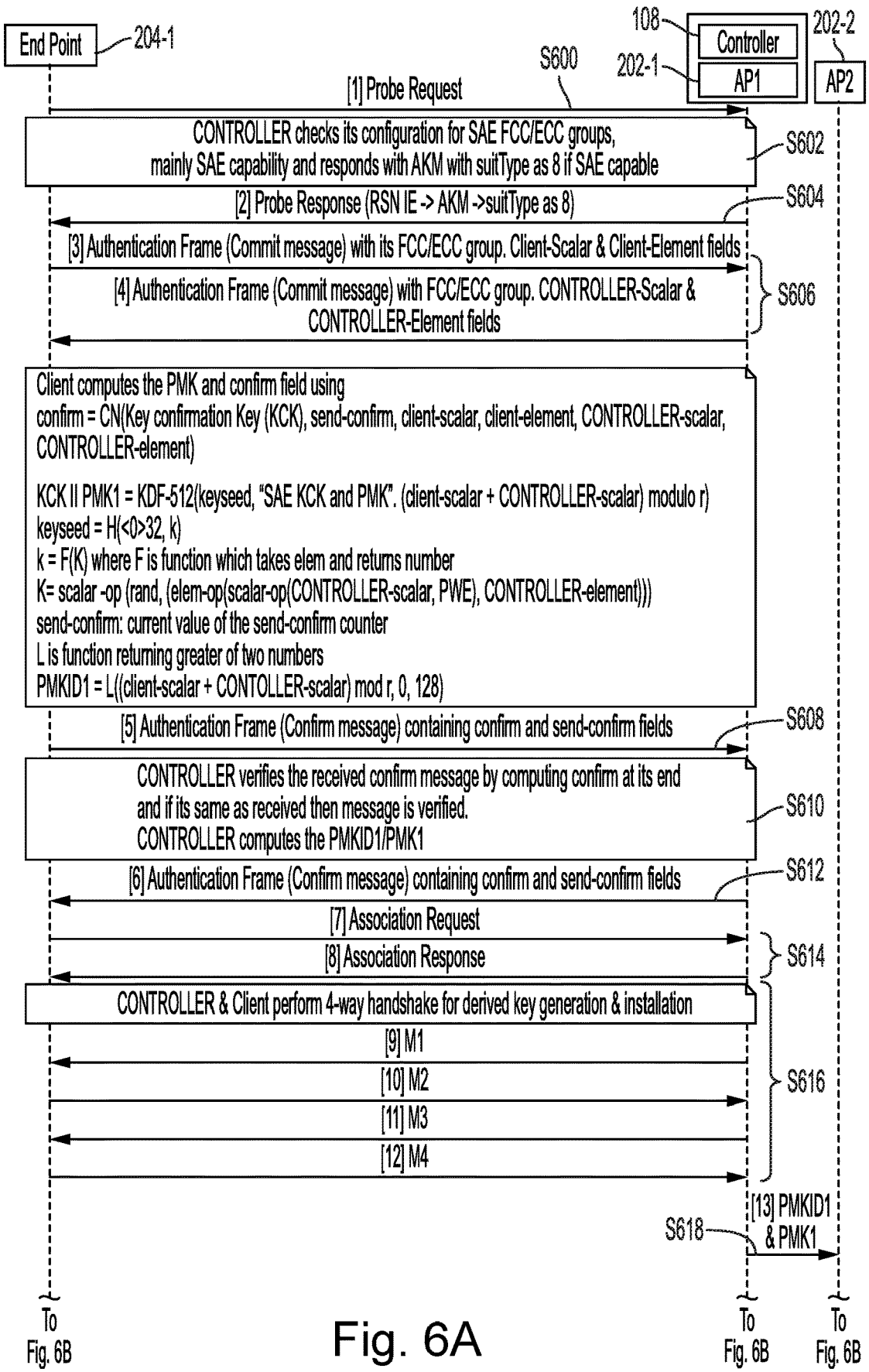
FIGS. 6A-B is an example call flow of a SAE based roaming management method, according to an aspect of the present disclosure.
Figure 6B:
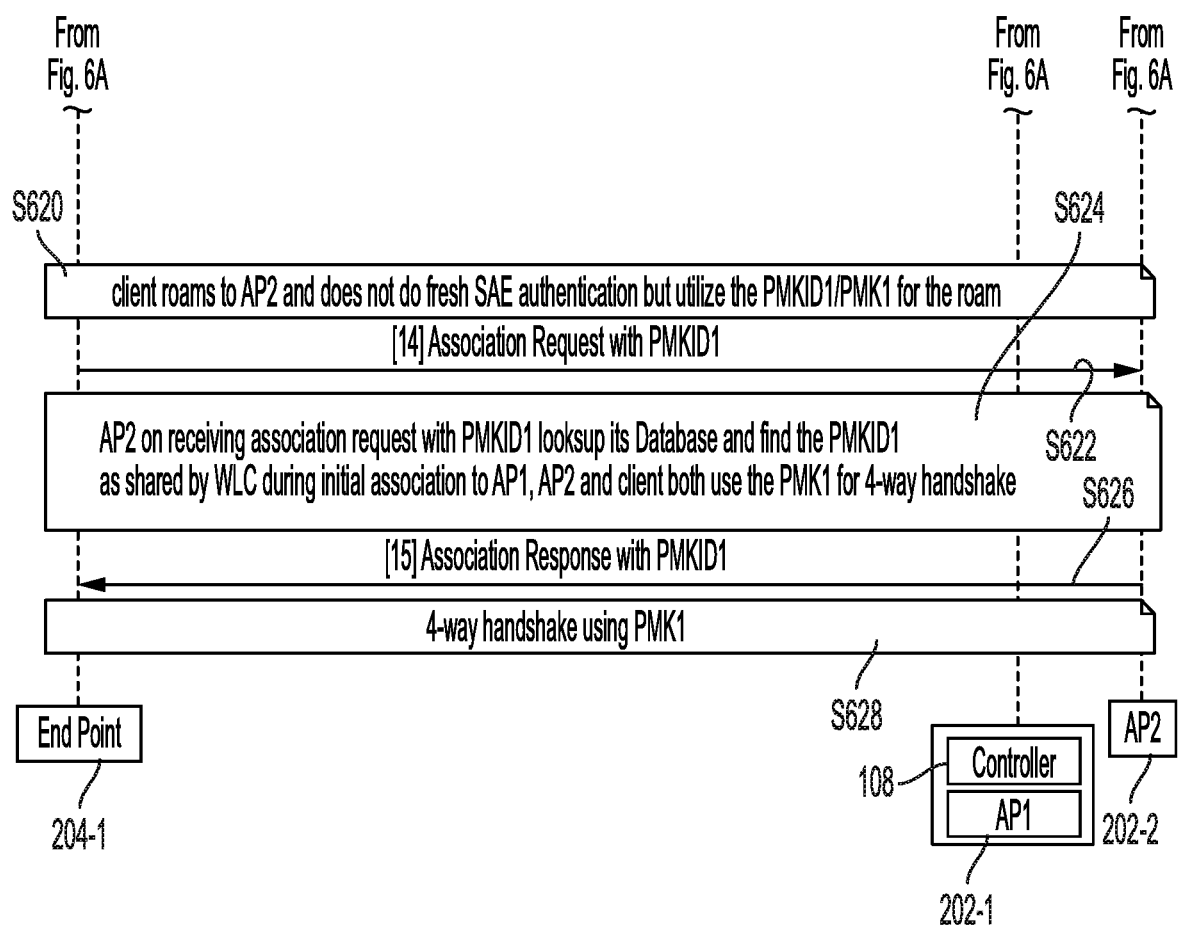
Figure 7:
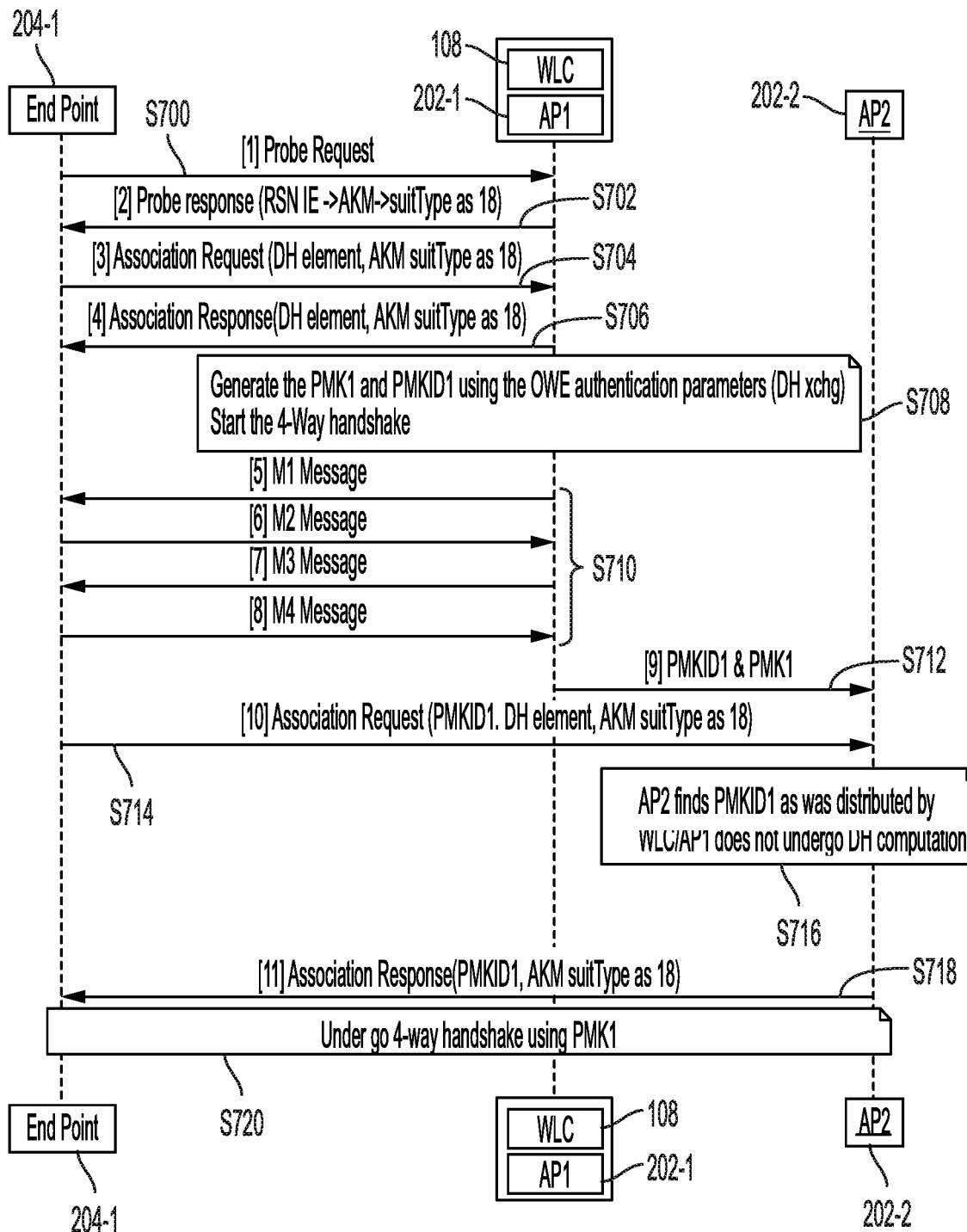
FIG. 7 is an example call flow of an OWE based roaming management method, according to an aspect of the present disclosure.

FIGS. 6A-B is an example call flow of a SAE based roaming management method, according to an aspect of the present disclosure. In example call flow of FIGS. 6A-B, controller (e.g., WLC 108) and access point 202-1 are illustrated as a single node.

At S600, WLC 108 receives a probe request from endpoint 204-1 to connect to access point 202-1 (first access point).

At S602, WLC 108 determines its SAE authentication capability and at S604 responds to endpoint 204-1 with an Authentication Key Management (AKM) having suitType 8 indicating that WLC 108 is SAE capable.

At S606, WLC 108 and endpoint 204-1 exchange authentication frames, according to any known or to be developed protocol for exchanging authentication frames.

After exchange of authentication frames, endpoint 204-1 computes PMK and PMKID (e.g., PMK1 and PMKID1) and confirm field using, for example, the following syntax/protocol. PMK1 is for associating with/connecting to first access point AP 202-1. The generated PMK and PMKID may be referred to as association identification token and may be unique to endpoint 204-1.

confirm=CN(Key confirmation Key (KCK), send-confirm, client-scalar, client-element, CONTROLLER-scalar, CONTROLLER-element)

LCL‖PMK1=KDF-512(keyseed, "SAE KCK and PNK", (Client-scalar+CONTROLLER-scalar) modulo r), where Keyseed=H(<0>32,k);

K=F(K) where F is a function which takes an element and returns a number;

K=scalar.op(rand, (elem-op(scalar-op(CONTROLLER-scalar, PWE), CONTROLLER-element)));

Send-confirm: current value of the send-confirm counter;

L is a function returning greater of two numbers; and

PMKID1=L((client-scalar+CONTROLLER.scalar) mod r, 0, 128).

At S608, WLC 108 receives a confirm message generated by endpoint 204-1 and at S610 verifies the confirm message. Successful verification of the confirm message is indicative of a successful SAE authentication. In one example, when at S610 WLC 108 is not able to verify the received confirm message, WLC 108 informs endpoint 204-1 accordingly and denies endpoint 204-1 access to access point 202-1.

However, if at S610, WLC 108 verifies the confirm message, WLC 108 generates PMK and PMKID (association identification token), according to any known or to be developed method. Thereafter, at S612, a corresponding authentication message is sent by WLC 108 to endpoint 204-1 acknowledging verification of the confirm message.

Thereafter, at S614, WLC 108 may receive an association request from endpoint 204-1 to connect to access point 202-1 and may send a corresponding response to endpoint 204-1 to confirm the association. At S616, endpoint 204-1 and WLC 108 may also perform a 4-way handshake for derived key generation and installation as known (e.g., by exchange M1, M2, M3 and M4 messages). At S616, WLC 108 and endpoint 204-1 exchange generated association identification tokens at each of WLC 108 and endpoint 204-1. At this point, endpoint 204-1 is connected to associated with) access point 202-1.

At S618, WLC 108 sends (distributes) the association identification token (PMK and PMKID (e.g., PMK1 and PMKID1)) to other access points in setting 200 such as access point 202-2, 202-3 and/or 202-4 (with access point 202-2 used as an example of the other access point in FIG. 6). In one example, association identification token is shared with every active access point in setting 200.

With PMK and PMKID (association identification token) now available to all access points in setting 200, at S620, endpoint 204-1 may roam to a second access point (e.g., access point 202-2).

At S622, endpoint 204-1 sends an association request to access point 202-2 with PMKID1. Given that at S618, access point 202-2 received PMK1 and PMKID1, access point 202-2 can confirm the PMKID1 received from endpoint 204-1 at S624.

Thereafter, at S626, access point 202-2 responds to endpoint 204-1 with an association response including PMKID1. Thereafter, at S628, endpoint 204-1 and access point 202-2 may perform a 4way handshake using PMK1, according to known or to be developed protocols and methods of doing so in order to endpoint 204-1 to connect to access point 202-2.

Similarly, FIG. 7 is an example call flow of an OWE based roaming management method, according to an aspect of the present disclosure. In example call flow of FIG. 7, controller (e.g., WLC 108) and access point 202-1 are illustrated as a single node.

At S700, WLC 108 receives a probe request from endpoint 204-1 to connect to access point 202-1 (first access point).

At S702, WLC 108 sends a probe response back to endpoint 204-1 (e.g., RSN IE→AKM→suitType as 18)).

At S704, WLC 108 receives an association request from endpoint 204-1 (e.g., Diffie-Hellman (DH) element, AKM suitType as 18).

At S706, WLC 108 response with an association response back to endpoint 204-1 (e.g., DH element, AKM suitType as 18).

At S708, WLC 108 generates association identification token (e.g., PMK and PMKID) using OWE authentication parameters (e.g., DH key exchange).

At S710, WLC 108 performs a four way handshake process (using M1, M2, M3 and M4 messages) with endpoint 204-1. Using the association identification token, endpoint 204-1 connects to access point 202-1.

At S712, WLC 108 sends (distribute) the generated association identification token (e.g., PMK and PMKID) to second access point (e.g., access point 202-2). In one example, at S712, WLC 108 may send the association identification token generated at S708 to every other access point in setting 200).

With second access point 202-2 having the generated PMK and PMKID, at S714, endpoint 204-1 may roam to a second access point (e.g., access point 202-2) and send an association request to access point 202-2 with PMKID1. Given that at S712, access point 202-2 received PMK1 and PMKID from WLC 108, access point 202-2 can confirm the PMKID1 received from endpoint 204-1 at S716 without performing DH key computation and exchange.

Thereafter, at S718, access point 202-2 responds to endpoint 204-1 with an association response including PMKID1 without having to re-perform the OWE authentication process. Thereafter, at S420, endpoint 204-1 and access point 202-2 may perform a 4way handshake using PMK1, according to known or to be developed protocols and methods of doing so in order for endpoint 204-1 to connect to access point 202-2.

Example embodiments described above are based on a network structure where access points 202, network controller appliance 104 and WLC 108 are all provided and operated by a single vendor. However, the present disclosure is not limited to.

In another example, in setting 200, there may be multiple access points, where each subset (one or more) of access points are provided and operated by a different vendor. In such case, each subset may be associated with a different WLC or network controller appliance. Accordingly, after endpoint 204-1 associates with a first access point (this having generated association identification token PMK1 and PMKID1), endpoint 204-1 may attempt to associate with a second access point, where second access point is provided and operated by a different vendor. However, because second access point is associated with a different WLC/network controller appliance than the first access point, second access point does not have the generated association identification token PMK1 and PMKID1 and thus rejects endpoint 204-1's association request. Therefore, in this multi-vendor setting, each endpoint may store a count for such rejections by access points of different vendors and once the count is above a threshold (which can be a configurable parameter determined based on experiment and/or empirical studies), each endpoint may then perform SAE/OWE authentication every time the endpoint attempts to switch association from first access point to the second access point.

Figure 8:
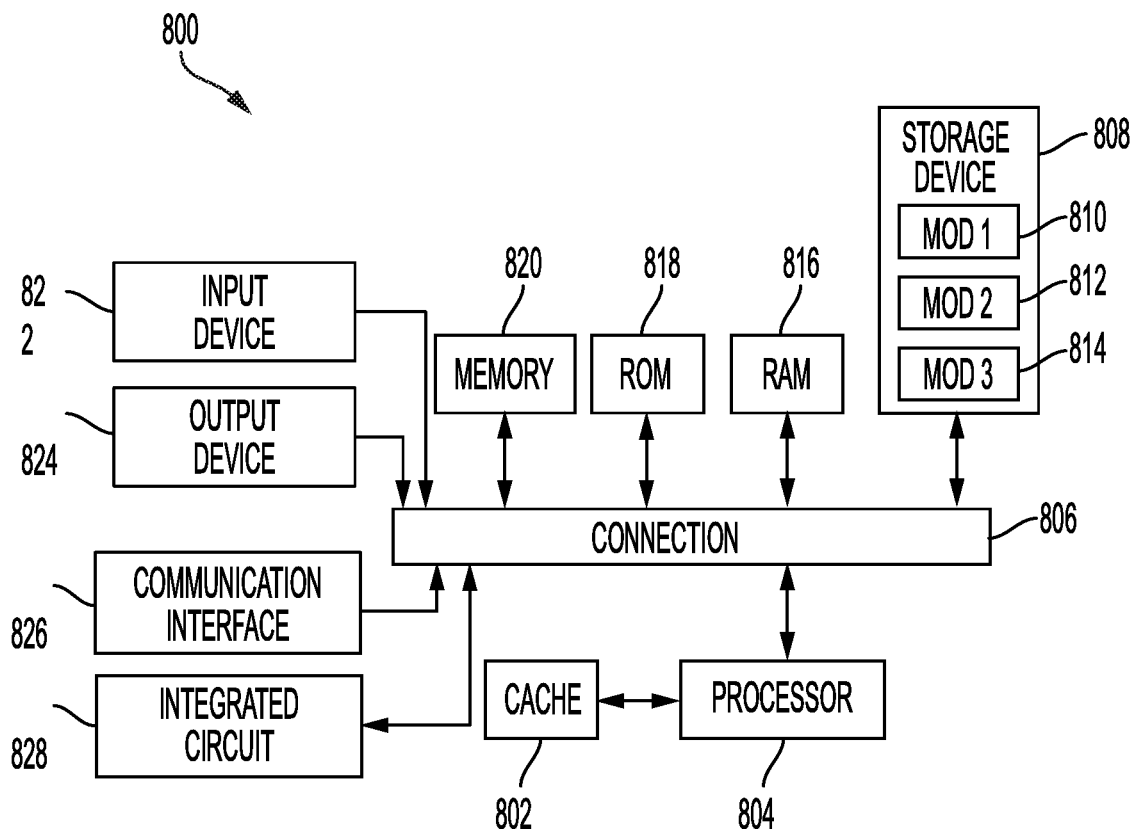
FIG. 8 illustrates an example system including various hardware computing components, according to an aspect of the present disclosure.

With various examples of the present disclosure described above with reference to FIGS. 1-7, the disclosure now turns to FIG. 8, which describes example system and hardware components that can be used to implement any one of endpoints 204, access point 202, WLC 108, network controller appliance 104, etc.

FIG. 8 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 8 illustrates a system bus computing system architecture (system) 800 wherein the components of the system are in electrical communication with each other using a connection 806. Exemplary system 800 includes a cache 802 and a processing unit (CPU or processor) 804 and a system connection 806 that couples various system components including the system memory 820, such as read only memory (ROM) 818 and random access memory (RAM) 816, to the processor 804. System 800 can include a cache of high-speed memory connected directly with, in close proximity to, or integrated as part of the processor 804. System 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions. Other system memory 820 may be available for use as well. The memory 820 can include multiple different types of memory with different performance characteristics. The processor 804 can include any general purpose processor and a service component, such as service (SVC) 1 810, service (SVC) 2 812, and service (SVC) 3 814 stored in storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with system 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with system 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 816, read only memory (ROM) 818, and hybrids thereof.

System 800 can include an integrated circuit 828, such as an application-specific integrated circuit (ASIC) configured to perform various operations. The integrated circuit 828 can be coupled with the connection 806 in order to communicate with other components in system 800.

The storage device 808 can include software services (SVC) 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A network controller of a WiFi Protected Access Protocol 3 ("WAP 3") network the network controller being connected to an edge router, the network controller being connected to a first and second access point connected thereto via the edge router, the network controller being connected to a third access point having no connection to the edge router, the network controller comprising:
   memory having computer-readable instructions stored therein; and
   one or more processors configured to execute the computer-readable instructions to:
      receive a request from an endpoint to connect to the first access point of the WAP 3 network using one of a Simultaneous Authentication of Equals (SAE) and an Opportunistic Wireless Encryption (OWE) association;
      generate association identification token comprising one of a Pairwise Master Key (PMK) and a PMK identifier (PMKID) for the endpoint to connect to the first access point of the WAP 3 network; and
      distribute the association identification token to the second access point and not the third access point prior to the endpoint attempting to connect to the second access point of the WAP 3 network, the association identification token being used by the second access point of the WAP 3 network to validate a subsequent request by the endpoint to connect to the second access point of the WAP 3 network using a 4-way handshake;
   wherein the validation does not include any verification of the associated identification token with the network controller,
   whereby any requirement for the endpoint to perform more than one of authentication processes and SAE or OWE associations while roaming between access points connected to the network controller via the edge router is eliminated;
   and whereby only one of the PMK and PMKID that corresponds to the endpoint is generated until the endpoint attempts to roam to another access point that is not connected to the network controller via the edge router.

2. The network controller of claim 1, wherein
   the network controller is configured to generate the association identification token only once for connecting the endpoint to the first access point; and
   the association identification token is used for connecting the endpoint to any subsequent access point that is communicatively coupled to the network controller.

3. The network controller of claim 2, wherein the one or more processors are configured to generate the association identification token upon verifying a confirm message received from the endpoint.

4. The network controller of claim 1, wherein the PMK and the PMKID of the association identification token are unique to the endpoint.

5. The network controller of claim 1, wherein the one or more processors are further configured to execute the computer-readable instructions to:
   send the association identification token to the endpoint and the first access point, wherein the endpoint is configured to connect to the first access point using the association identification token and a handshake process.

6. The network controller of claim 1, wherein the network controller is a wireless local area network controller that is configured to communicatively control and manage a number of access points including the first access point and the second access point.

7. The network controller of claim 1, wherein the network controller, the first access point and the second access point form a network for the endpoint to roam on.

8. The network controller of claim 1, wherein the first access point and the second access point have a same site-tag.

9. The network controller of claim 1, wherein the endpoint and the network controller do not store a table of per endpoint per access point association identification token.

10. A method for managing a network controller of a WiFi Protected Access Protocol 3 ("WAP 3") network, the network controller being connected to an edge router, the network controller being connected to a first and second access point connected thereto via the edge router, the network controller being connected to a third access point having no connection to the edge router, the method comprising:
   receiving, at the network controller, a request from an endpoint to connect to a first access point of the WAP 3 network using one of a Simultaneous Authentication of Equals (SAE) and an Opportunistic Wireless Encryption (OWE) association;
   generating, at the network controller, association identification token comprising one of a Pairwise Master Key (PMK) and a PMK identifier (PMKID) for the endpoint to connect to the first access point of the WAP 3 network; and
   distributing, at the network controller, the association identification token to the second access point and not the third access point of the WAP 3 network prior to the endpoint attempting to connect to the second access point of the WAP 3 network, the association identification token being used by the second access point to validate a subsequent request by the endpoint to connect to the second access point of the WAP 3 network using a 4-way handshake;
   wherein the validation does not include any verification of the associated identification token with the network controller,
   whereby any requirement for the endpoint to perform more than one of authentication processes and SAE or OWE associations while roaming between access points connected to the network controller via the edge router is eliminated;
   and whereby only one of the PMK and PMKID that corresponds to the endpoint is generated until the endpoint attempts to roam to another access point that is not connected to the network controller via the edge router.

11. The method of claim 10, wherein
   the association identification token is generated only once for connecting the endpoint to the first access point; and
   the association identification token is used for connecting the endpoint to any subsequent access point that is communicatively coupled to the network controller.

12. The method of claim 10, wherein the association identification token is generated after a confirm message received from the endpoint is verified.

13. The method of claim 12, further comprising:
exchanging the association identification token with the endpoint.

14. The method of claim 10, wherein the PMK and the PMKID of the association identification are unique to the endpoint.

15. The method of claim 10, further comprising:
sending the association identification token to the endpoint and the first access point, the endpoint connecting to the first access point using the association identification token and a handshake process.

16. One or more non-transitory computer-readable media comprising computer-readable instructions, which when executed by one or more processors of a network controller of a WiFi Protected Access Protocol 3 ("WAP 3") network, the network controller being connected to an edge router, the network controller being connected to a first and second access point connected thereto via the edge router, the network controller being connected to a third access point having no connection to the edge router, cause the network controller to perform operations comprising:
receive a request from an endpoint to connect to the first access point of the WAP 3 network using one of a Simultaneous Authentication of Equals (SAE) and an Opportunistic Wireless Encryption (OWE) association;
generate association identification token comprising one of a Pairwise Master Key (PMK) and a PMK identifier (PMKID) for the endpoint to connect to the first access point of the WAP 3 network; and
distribute the association identification token to the second access point prior to the endpoint attempting to connect to the second access point and not the third access point of the WAP 3 network, the association identification token being used by the second access point of the WAP 3 network to validate a subsequent request by the endpoint to connect to the second access point of the WAP 3 network using a 4-way handshake;
wherein the validation does not include any verification of the associated identification token with the network controller,
whereby any requirement for the endpoint to perform more than one of authentication processes and SAE or OWE associations while roaming between access points connected to the network controller via the edge router is eliminated;
and whereby only one of the PMK and PMKID that corresponds to the endpoint is generated until the endpoint attempts to roam to another access point that is not connected to the network controller via the edge router.

17. The one or more non-transitory computer-readable media of claim 16, wherein
the association identification token is generated only once for connecting the endpoint to the first access point; and
the association identification token is used for connecting the endpoint to any subsequent access point that is communicatively coupled to the network controller.

18. The one or more non-transitory computer-readable media of claim 16, wherein execution of the computer-readable instructions further cause the network controller to verify a confirm message received from the endpoint before generating the association identification token.

19. The one or more non-transitory computer-readable media of claim 18, wherein execution of the computer-readable instructions further cause the network controller to exchange the association identification token with the endpoint.

20. The one or more non-transitory computer-readable media of claim 16, wherein the PMK and the PMKID of the association identification token are unique to the endpoint.

* * * * *